US012726022B2

(12) United States Patent
Lee et al.

(10) Patent No.: US 12,726,022 B2
(45) Date of Patent: Sep. 1, 2026

(54) POWER SUPPLY

(71) Applicant: CHICONY POWER TECHNOLOGY CO., LTD., New Taipei City (TW)

(72) Inventors: Min-Han Lee, New Taipei City (TW); Chun-Yen Chen, New Taipei City (TW)

(73) Assignee: CHICONY POWER TECHNOLOGY CO., LTD., New Taipei City (TW)

( * ) Notice: Subject to any disclaimer, the term of this patent is extended or adjusted under 35 U.S.C. 154(b) by 224 days.

(21) Appl. No.: 18/622,325

(22) Filed: Mar. 29, 2024

(65) Prior Publication Data

US 2025/0219522 A1 Jul. 3, 2025

(30) Foreign Application Priority Data

Jan. 3, 2024 (TW) ................................ 113100297

(51) Int. Cl.
*H02J 1/108* (2026.01)
*H02J 9/06* (2006.01)
(Continued)

(52) U.S. Cl.
CPC .............. *H02J 1/108* (2013.01); *H02J 9/068* (2020.01); *G06F 1/263* (2013.01); *H02M 1/008* (2021.05)

(58) Field of Classification Search
CPC .... G06F 1/263; G06F 1/266; H02J 1/10–109; H02J 9/068; H02M 1/007; H02M 1/008; H02M 1/009; H02M 1/10
See application file for complete search history.

(56) References Cited

U.S. PATENT DOCUMENTS 6,606,257 B2 8/2003 Bourdillon
7,224,085 B2 5/2007 Chen et al.
(Continued)

FOREIGN PATENT DOCUMENTS

CN 103840671 B 8/2016
CN 208299523 U 12/2018
(Continued)

OTHER PUBLICATIONS

Machine translation of TW I796859 B (Mar. 21, 2023), previously cited. Obtained on Dec. 9, 2025 from https://worldwide.espacenet.com/ (Year: 2023).*

(Continued)

*Primary Examiner* — Fred E Finch, III
(74) *Attorney, Agent, or Firm* — MUNCY, GEISSLER, OLDS & LOWE, P.C.

(57) ABSTRACT

A power supply includes a first conversion circuit, a second conversion circuit, a control circuit, a first switching circuit, a second switching circuit, and a switching switch. When the control circuit receives a first voltage requirement or a second voltage requirement, the control circuit controls the first switching circuit to connect a path from the first conversion circuit to the first output terminal, and disconnect a path from the first conversion circuit to the second output terminal, and the control circuit controls the switching circuit and the second switching circuit to disconnect a path from the second conversion circuit to the first output terminal and a path from the second conversion circuit to the second output terminal to prevent the first voltage from flowing back to the second conversion circuit or the second voltage from being mistakenly supplied to the first output terminal and the second output terminal.

18 Claims, 10 Drawing Sheets

(51) Int. Cl.
*G06F 1/26* (2006.01)
*H02M 1/00* (2006.01)

(56) References Cited

U.S. PATENT DOCUMENTS

| | | | | |
|---|---|---|---|---|
| 8,159,200 | B2 | 4/2012 | Lesso et al. | |
| 9,425,699 | B2 | 8/2016 | Han et al. | |
| 9,755,454 | B1 * | 9/2017 | Reynov | H02J 1/08 |
| 10,148,183 | B1 | 12/2018 | Peng et al. | |
| 2018/0054868 | A1 | 2/2018 | Yan et al. | |
| 2021/0111578 | A1 * | 4/2021 | Ou | G06F 1/266 |
| 2021/0273473 | A1 | 9/2021 | Jahan et al. | |
| 2022/0271645 | A1 * | 8/2022 | Chang | H02M 1/008 |
| 2022/0337056 | A1 * | 10/2022 | Yeh | H02J 1/106 |
| 2023/0333616 | A1 * | 10/2023 | Ramanjani | H03K 17/76 |
| 2024/0372458 | A1 * | 11/2024 | Rader, III | H02M 3/33561 |
| 2025/0047124 | A1 * | 2/2025 | Chen | H02J 7/0013 |

FOREIGN PATENT DOCUMENTS

| | | | |
|---|---|---|---|
| CN | 113676055 | A | 11/2021 |
| CN | 215498754 | U | 1/2022 |
| CN | 215990575 | U | 3/2022 |
| TW | 595074 | B | 6/2004 |
| TW | M564745 | U | 8/2018 |
| TW | 201937328 | A | 9/2019 |
| TW | I694663 | B | 5/2020 |
| TW | 202207591 | A | 2/2022 |
| TW | I773084 | B | 8/2022 |
| TW | I796859 | B | 3/2023 |

OTHER PUBLICATIONS

Office Action dated Jul. 15, 2024 of the corresponding Taiwan patent application No. 113100297.

* cited by examiner

POWER SUPPLY

BACKGROUND

Technical Field

The present disclosure relates to a power supply, and more particularly to a power supply with a plurality of power outputs.

Description of Related Art

The statements in this section merely provide background information related to the present disclosure and do not necessarily constitute prior art.

In recent years, consumer electronic devices have become more and more popular, with the proliferation of various rechargeable consumer electronic devices such as mobile phones, laptops, tablets, and personal digital assistants (PDAs). Most of these electronic devices require charging equipment to charge them, and therefore the requirement for the charging equipment is gradually increasing. As the power supply capabilities of charging equipment increase, the charging equipment has also begun to have multiple USB charging ports that can simultaneously charge multiple products.

However, in currently applications of multiple USB charging ports on the market, most use one converter plus multiple step-down (bulk) converters in the subsequent stage to perform the step-down operation. Therefore, the output of the converter must be stepped down by these buck converters respectively before it can charge electronic devices. Although this structure is simple to control, multiple buck converters require a large number of parts, occupy a large volume, and will also reduce efficiency due to periodic line losses. In addition, it is also necessary to consider that the voltages of each charging port are different to cause the charging port with a higher voltage to reversely feed (flow) back into the buck converter with a lower voltage through the internal circuit of the charging equipment, thereby causing the risk of charging equipment failure.

Therefore, how to design a power supply to prevent the above-mentioned situation of feeding-back voltage from occurring has become a critical topic in this field.

SUMMARY

In other to solve the above-mentioned problems, the present disclosure provides a power supply. The power supply includes a first conversion circuit, a second conversion circuit, a control circuit, a first switching circuit, a second switching circuit, and a switching switch. a first conversion circuit converts an input voltage into a first voltage. The second conversion circuit is coupled to the first conversion circuit, and the second conversion circuit converts the first voltage into a second voltage. The control circuit is coupled to the first conversion circuit and the second conversion circuit. The first switching circuit is coupled to the control circuit, the first conversion circuit, a first output terminal, and a second output terminal. The second switching circuit is coupled to the control circuit, the first output terminal, and the second output terminal. The switching switch is coupled to the control circuit, the second conversion circuit, and the second switching circuit. When the control circuit receives a first voltage requirement of the first output terminal or a second voltage requirement of the second output terminal, the control circuit controls the first switching circuit to connect a path from the first conversion circuit to the first output terminal when the first voltage requirement is received, and disconnect a path from the first conversion circuit to the second output terminal, and the control circuit controls the switching circuit and the second switching circuit to disconnect a path from the second conversion circuit to the first output terminal and a path from the second conversion circuit to the second output terminal so as to prevent the first voltage from flowing back to the second conversion circuit or the second voltage from being mistakenly supplied to the first output terminal and the second output terminal.

In other to solve the above-mentioned problems, the present disclosure provides a power supply. The power supply includes a first conversion circuit, a plurality of second conversion circuits, a control circuit, a first switching circuit, a plurality of second switching circuits, and a plurality of switching switches. The first conversion circuit converts an input voltage into a first voltage. The plurality of second conversion circuits is coupled to the first conversion circuit, and convert the first voltage into a plurality of second voltages. The control circuit is coupled to the first conversion circuit and the plurality of second conversion circuits. The first switching circuit is coupled to the control circuit, the first conversion circuit, and a plurality of output terminals. The plurality of second switching circuits is coupled to the control circuit and the plurality of output terminals. The plurality of switching switches is coupled to the control circuit, and correspondingly coupled to the plurality of second conversion circuits and the plurality of second switching circuits. When the control circuit receives a voltage requirement of one of the plurality of output terminals, the control circuit controls the first switching circuit to connect a path from the first conversion circuit to the output terminal, and disconnect paths from the first conversion circuit to the remaining output terminals, and controls the switching switches and the plurality of second switching circuits to bidirectionally disconnect the paths from the plurality of second conversion circuits to the output terminals so as to prevent the first voltage from flowing back to the plurality of second conversion circuits or the plurality of second voltage from being mistakenly supplied to the output terminals.

The main purpose and effect of the present disclosure is that through the configuration of the second switching circuit and the switching switches, the present disclosure can bidirectionally disconnect paths from the second switching circuit to the first output terminal and the second output terminal so as to prevent the first voltage from flowing back to the second conversion circuit, or the second voltage from being mistakenly supplied to the first output terminal and the second output terminal.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWINGS

The present disclosure can be more fully understood by reading the following detailed description of the embodiment, with reference made to the accompanying drawing as follows.

DETAILED DESCRIPTION

Figure 1:
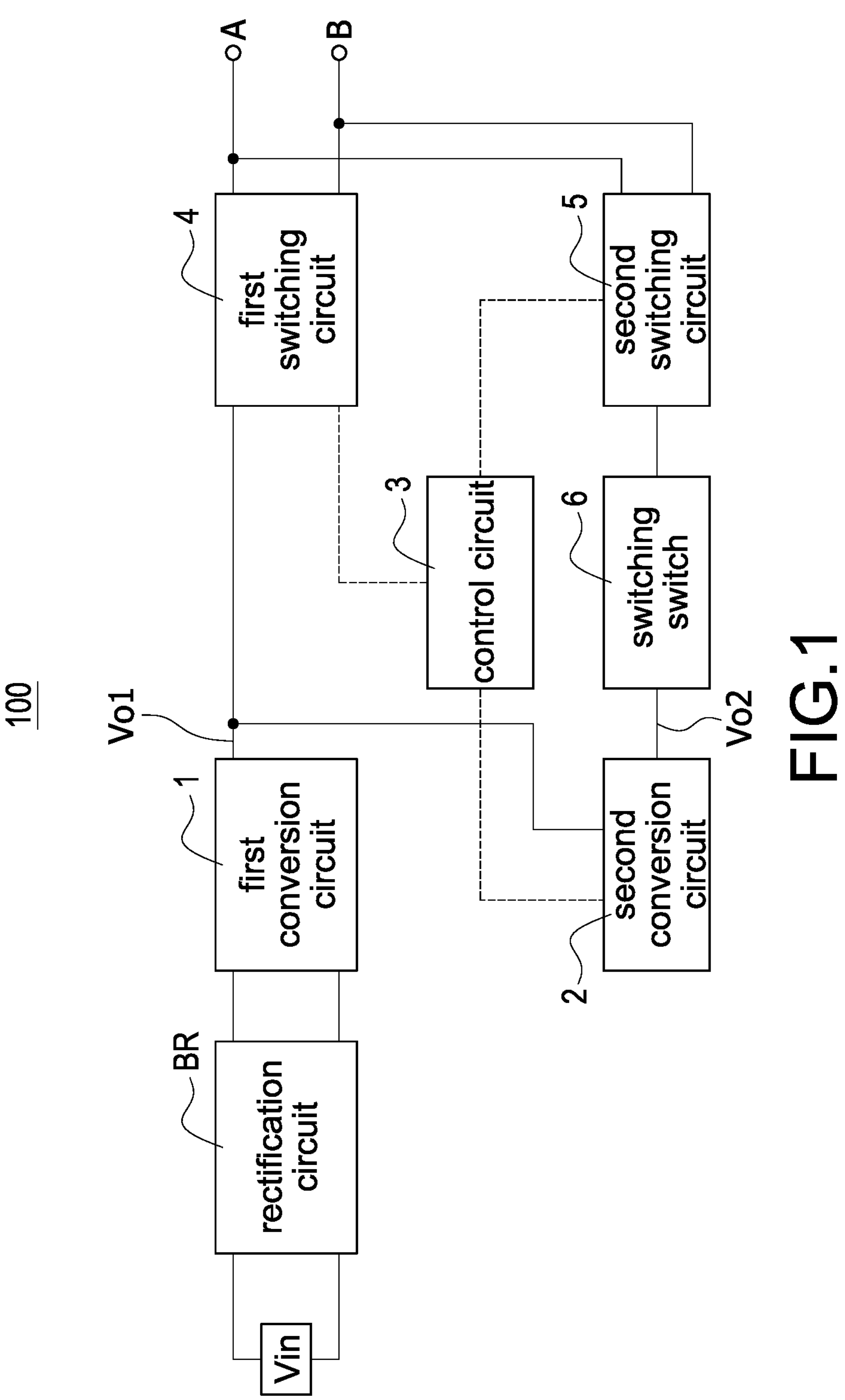
FIG. 1 is a block circuit diagram of a power supply according to a first embodiment of the present disclosure.

Reference will now be made to the drawing figures to describe the present disclosure in detail. It will be understood that the drawing figures and exemplified embodiments of present disclosure are not limited to the details thereof.

Please refer to FIG. 1, which shows a block circuit diagram of a power supply according to a first embodiment of the present disclosure. The power supply 100 receives an input voltage Vin. The power supply 100 includes a rectification circuit BR, a first conversion circuit 1, a second conversion circuit 2, a control circuit 3, a first switching circuit 4, a second switching circuit 5, and a switching switch 6. An input terminal of the first conversion circuit 1 is coupled to the rectification circuit BR, and an output terminal of the first conversion circuit 1 is coupled to one terminal of the first switching circuit 4. An input terminal of the second conversion circuit 2 is coupled to the output terminal of the first conversion circuit 1, and an output terminal of the second conversion circuit 2 is coupled to one terminal of the switching switch 6. The power supply 100 includes a first output terminal A and a second output terminal B, and the other terminal of the first switching circuit 4 is coupled to the first output terminal A and the second output terminal B. One terminal of the second switching circuit 5 is coupled to the other terminal of the switching switch 6, and the other terminal of the second switching circuit 5 is coupled to the first output terminal A and the second output terminal B. The control circuit 3 is coupled to the second conversion circuit 2, the first switching circuit 4, the second switching circuit 5, and the switching switch 6, and controls the second conversion circuit 2, the first switching circuit 4, the second switching circuit 5, and the switching switch 6 to perform their operations.

In particular, the first output terminal A and the second output terminal B may be connected by a load 200 respectively so that the power supply 100 can communicate with the load 200 through the first output terminal A or the second output terminal B, or the power supply 100 can supply power to the load 200 through the first output terminal A or the second output terminal B. In one embodiment, the first conversion circuit 1 may preferably be, for example, but not limited to, a flyback converter to provide electrical isolation effect between the input terminal and the output terminal of the power supply 100. Any switching converter that can convert the input voltage Vin and then supply power to the load 200 should be included in the scope of this embodiment. In addition, in one embodiment, the first output terminal A and the second output terminal B may preferably be Type-C connection ports, but are not limited to this. Any connection port that can transmit communication signals and provide voltages of different voltage levels to the load 200 should be included in the scope of this embodiment.

Furthermore, the rectification circuit BR rectifies the input voltage Vin into a DC voltage Vdc, and a controller (not shown, may be integrated into the control circuit 3, or independently configured inside the first conversion circuit 1) of the first conversion circuit 1 controls the first conversion circuit 1 to convert the input voltage Vin into a first voltage Vo1. If the controller inside the first conversion circuit 1 is independently configured inside the first conversion circuit 1, the control circuit 3 can provide a control signal to the controller inside the first conversion circuit 1 to perform a power conversion to the first conversion circuit 1. The control circuit 3 controls the second conversion circuit 2 to convert the first voltage Vo1 into a second voltage Vo2. Since the first conversion circuit 1 is generally a converter with an isolation transformer to electrically isolate its input terminal and output terminal, the second conversion circuit 2 may preferably be a non-isolated converter. In particular, the second conversion circuit 2 may preferably be a buck converter to convert the higher level first voltage Vo1 into the lower level second voltage Vo2, but is not limited thereto. Therefore, the second conversion circuit 2 may also be, for example, but not limited to, a boost converter or a buck-boost converter depending on the operation and application of the power supply 100.

Moreover, the control circuit 3 also performs a turned-on/off control to the first switching circuit 4, the second switching circuit 5, and the switching switch 6 to control the power supply 100 to provide the first voltage Vo1 or the second voltage Vo2 to the first output terminal A or the second output terminal B. Specifically, the control circuit 3 includes a power delivery controller (PD controller), which generally has a USB-PD protocol. Therefore, the control circuit 3 can acquire an output voltage level required by the load 200 by a hand-shaking communicating with the load 200. In general, when one or more loads 200 are connected into the first output terminal A or the second output terminal B, the control circuit 3 can realize that a device is connected in through detection pins of the output terminals A, B. Afterward, the power supply 100 must provide a default voltage (such as but not limited to 5V) to the output terminals A, B (which may be provided by the first conversion circuit 1 or the second conversion circuit 2) coupled to the load 200, and accordingly the detection pins of the output terminals A, B can communicate with the load 200 mutually.

Therefore, the control circuit 3 needs to control the first switching circuit 4, the second switching circuit 5, and the switching switch 6 to conduct corresponding paths so that the first switching circuit 1 or the second switching circuit 2 can provide can provide the default voltage to the output terminals A, B, which are coupled to the load 200. After realizing the voltage level required by the load 200 through communication, the control circuit 3 controls the first conversion circuit 1 or the second conversion circuit 2 to provide the first voltage Vo1 or the second voltage Vo2 that meets the demand of the load 200 to the load 200. In particular, the power supply 100 uses the first voltage Vo1 provided by the first conversion circuit 1 as a primary power supplier, and the second voltage Vo2 provided by the second conversion circuit 2 as a secondary power provider.

When the first load 200 is connected to the output terminals A, B, the control circuit 3 realizes the voltage level required by the load 200 through the default voltage and the hand-shaking communication. Regardless of the required voltage level, the power supply 100 uses the first conversion circuit 1 to convert the input voltage Vin into the first voltage Vo1 (which is the same as the voltage level required by the load 200). At the same time, the control circuit 3 performs corresponding control to the second conversion circuit 2, the first switching circuit 4, the second switching circuit 5, and the switching switch 6 to provide the first voltage Vo1 to the corresponding output terminals A, B. After that, when another load 200 is connected in, the control circuit 3 realizes the voltage level required by the other load 200 through the default voltage and the hand-shaking communication. After comparing the voltage level required by the load 200 with the first voltage Vo1, the second conversion circuit 2, the first switching circuit 4, the second switching circuit 5, and the switch 6 are controlled accordingly to simultaneously provide output voltages at the voltage levels required by the two loads 200 (i.e., the first voltage Vo1 and the second voltage Vo2).

In one embodiment, since the control circuit 3 includes the power delivery controller (PD controller), the hand-shaking communication can be performed, but it does not rule out that the control circuit 3 can realize parameters of the load 200 through other communication methods (for example, but not limited to, the parameters of the detection load 200 are compared with the data of the internal storage device for confirmation). Therefore, the control circuit 3 is not limited to the operation mode that can only use the hand-shaking communication. However, in order to facilitate a detailed description of the technical features of the present disclosure, the hand-shaking communication will be used as a schematic example as follows.

Furthermore, when the power supply 100 provides the first voltage Vo1 to the load 200 coupled to the first output terminal A or the second output terminal B, the first voltage Vo1 may be reversely fed back to the output terminal of the second conversion circuit 2 to cause the second conversion circuit 2 to consume additional power, and even the second conversion circuit 2 may malfunction, which may cause the second conversion circuit 2 to fail. Similarly, when the second conversion circuit 2 provides the second voltage Vo2 (such as but not limited to the default voltage 5V), but it does not allow the second voltage Vo2 to be provided to the first output terminal A and the second output terminal B, it is also necessary to prevent the second voltage Vo2 from being conducted to the first output terminal A and the second output terminal B. Therefore, the main purpose and effect of the present disclosure is that through the configuration of the second switching circuit 5 and the switching switch 6, the path from the second conversion circuit 2 to the first output terminal A and the path from the second conversion circuit 2 to the second output terminal B can be bidirectionally disconnected so as to prevent the first voltage Vo1 from flowing back to the second conversion circuit 2, or the second voltage Vo2 being mistakenly supplied to the first output terminal A and the second output terminal B.

Specifically, when the first load 200 is coupled to one of the first output terminal A and the second output terminal B, the control circuit 3 realizes that a device is coupled through the detection pins of the output terminals A, B. Afterward, the control circuit 3 performs corresponding control to the first switching circuit 4, the second switching circuit 5, and the switching switch 6 to provide the default voltage (5V) converted by the first switching circuit 1 to the corresponding terminal (assumed to be the first output terminal). That is, the control circuit 3 controls the first switching circuit 4 to turn on the path from the first conversion circuit 1 to one terminal (i.e., the first output terminal A), and to turn off the path from the first conversion circuit 1 to the other terminal (i.e., the second output terminal B), and controls the switching switch 6 and the second switching circuit 5 to bidirectionally disconnect the path from the second conversion circuit 2 to the first output terminal A and the path from the second conversion circuit 2 to the second output terminal B. Therefore, it is possible to prevent the default voltage (5V) from flowing back to the second conversion circuit 2, or the second voltage Vo2 (under the operation of the second conversion circuit 2, and the second voltage Vo2 is the default voltage (5V)) from being mistakenly supplied to the first output terminal A and the second output terminal B.

Afterward, the control circuit 3 communicates with the load 200 through the detection pin of the corresponding terminal (i.e., the first output terminal A) to realize the voltage requirement of the load 200 (i.e., the voltage level required by the load 200). Furthermore, the control circuit 3 controls the first conversion circuit 1 to convert the input voltage Vin into the first voltage Vo1 corresponding to the voltage requirement. Afterward, the control circuit 3 continuously controls the first switching circuit 4 to connect the path from the first conversion circuit 1 to the first output terminal A, and to disconnect the path from the first conversion circuit 1 to the second output terminal B so as to provide the first voltage Vo1 to the load 200 coupled to the first output terminal A. Moreover, the control circuit 3 also controls the switching switch 6 and the second switching circuit 5 to bidirectionally disconnect the path from the second conversion circuit 2 to the first output terminal A and the path from the second conversion circuit 2 to the second output terminal B so as to prevent the first voltage Vo1 from flowing back to the second conversion circuit 2, or the second voltage Vo2 being mistakenly supplied to the first output terminal A and the second output terminal B.

Figure 2:
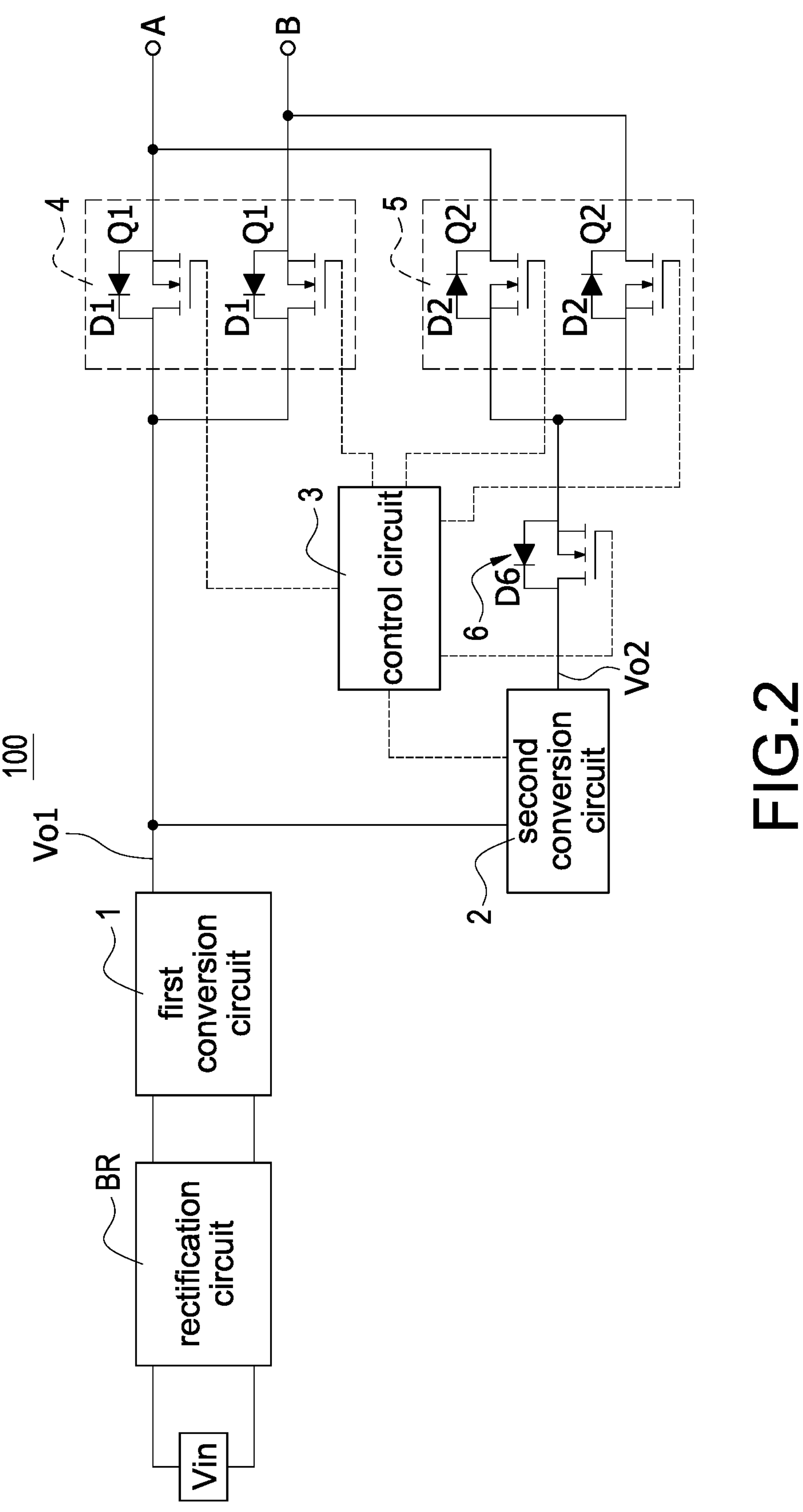
FIG. 2 is a detailed block circuit diagram of the power supply according to the first embodiment of the present disclosure.

Please refer to FIG. 2, which shows a detailed block circuit diagram of the power supply according to the first embodiment of the present disclosure, and also refer to FIG. 1. The preferred implementation of the first switching circuit 4 is that the first switching circuit 4 includes a plurality of first switches Q1; the preferred implementation of the second switching circuit 5 is that the second switching circuit 5 includes a plurality of second switches Q2. In particular, the number of the first switches Q1 corresponds to the number of the output terminals A, B, and the number of the second switches Q2 also corresponds to the number of the output terminals A, B. Therefore, the power supply 100 in the embodiment of FIG. 1 includes two first switches Q1 and the second switches Q2. One terminal of the first switch Q1 is coupled to the first conversion circuit 1, the other terminal of the first switch Q1 is respectively coupled to the first output terminal A and the second output terminal B, and a control terminal of the first switch Q1 is coupled to the control circuit 3. Similarly, one terminal of the second switch Q2 is coupled to the switching switch 6, the other terminal of the second switch Q1 is respectively coupled to the first output terminal A and the second output terminal B, and a control terminal of the second switch Q2 is coupled to the control circuit 3.

Since the switching switch 6 and the second switching circuit 5 must provide a bidirectional disconnection function between the second switching circuit 2 and the output terminals A, B, the switching switch 6 and the second switch Q2 must form a reverse connection structure. Specifically, the first switch Q1, the second switch Q2, and the switching switch 6 are preferably metal-oxide semi-field effect transistors (MOSFETs). The main reason is that when the metal-oxide semi-field effect transistor is turned on, the conduction resistance is low, and therefore the power loss can be significantly reduced when the first switch Q1, the second switch Q2, and the switching switch 6 are turned on. However, when the metal-oxide semi-field effect transistor (MOSFET) is not turned on, it has a junction diode D1, D2, D6 (i.e., a body diode), so even if it is turned off, it still has a unidirectional conduction path. Therefore, the structure in which the switching switch 6 and the second switch Q2 are reversely connected refers to the forward bias directions of the junction diodes D2, D6 so that the bidirectional disconnection structure is formed when the switch 6 and the second switch Q2 are both turned off.

Furthermore, the configuration of the junction diode D1 of the first switch Q1 may be reverse biased in a direction from the first conversion circuit 1 to the first output terminal A and the second output terminal B. According to the specifications of the USB-PD protocol, when the load 200 is removed, there must be no voltage on the output terminals A, B. Therefore, the first voltage Vo1 provided by the first conversion circuit 1 can be prevented from being mistakenly provided to the first output terminal A and the second output terminal B. Furthermore, the junction diode D2 of the second switch Q2 is configured to be forward biased from the switching switch 6 to the first output terminal A and the second output terminal B to prevent the voltages of the output terminals A, B from being reversed into the second conversion circuit 2. The junction diode D6 of the switching switch 6 is configured to be reverse biased from the second conversion circuit 2 to the second switch Q2 to prevent the second voltage Vo2 from flowing back to the output terminals A, B. Therefore, through the reverse connection of the junction diode D2 and the junction diode D6, when the second switch Q2 and the switching switch 6 are turned off, the path from the second conversion circuit 2 to the first output terminal A and the path from the second conversion circuit 2 to the second output terminal B are bidirectionally disconnected.

Similarly, the configuration of the junction diode D2 of the second switch Q2 may be reverse biased in a direction from the switching switch 6 to the first output terminal A and the second output terminal B, and the configuration of the junction diode D6 of the switching switch 6 may be forward biased from the second conversion circuit 2 to the second switch Q2. Therefore, when the second switch Q2 and the switching switch 6 are turned off, the path from the second conversion circuit 2 to the first output terminal A and the path from the second conversion circuit 2 to the second output terminal B are bidirectionally disconnected. In one embodiment, in addition to the embodiment of FIG. 2, there are many other embodiments of the first switching circuit 4 and the second switching circuit 5 that can achieve the same effect. Therefore, this embodiment only provides a simpler and lower-cost implementation, but is not limited thereto. For example, two metal-oxide semi-field effect transistors may be connected in reverse parallel to achieve a bidirectional disconnection effect, or the metal-oxide semi-field effect transistor may be replaced by a thyristor, which also has the function of disconnecting the path, etc., which will not be described in detail here. In addition, the circuit structure, coupling relationship and operation mode not illustrated in FIG. 2 are the same as those described in FIG. 1 and will not be described again here.

Figures 3A, 3B:
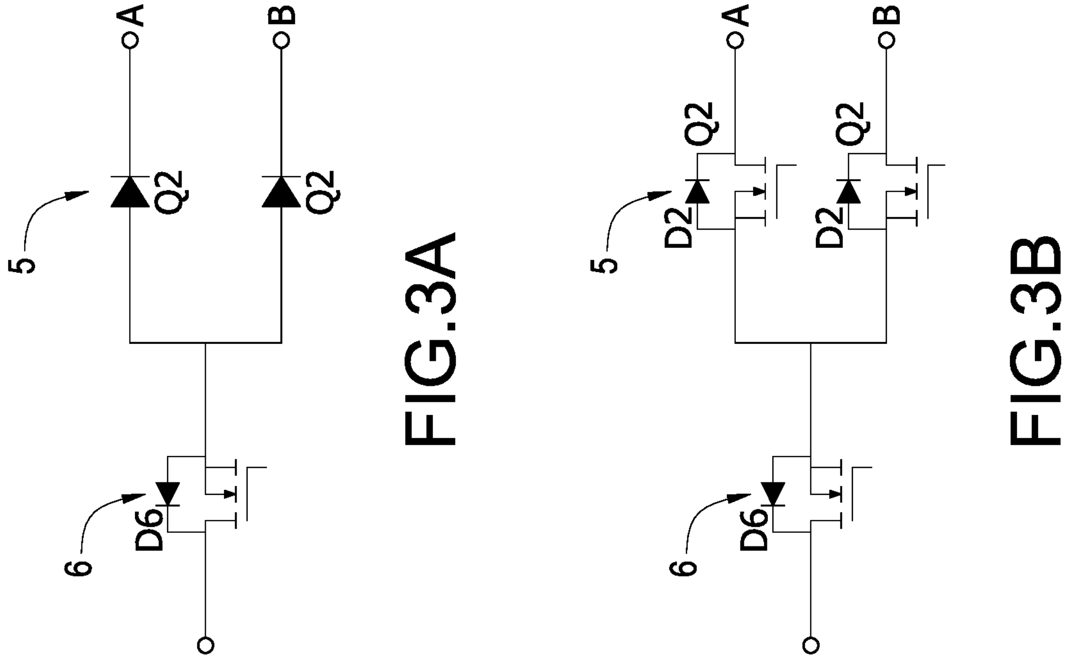
FIG. 3A is a block circuit diagram of a second switching circuit according to a first embodiment of the present disclosure.
FIG. 3B is a block circuit diagram of the second switching circuit according to a second embodiment of the present disclosure.

Please refer to FIG. 3A, which shows a block circuit diagram of a second switching circuit according to a first embodiment of the present disclosure, please refer to FIG. 3B, which shows a block circuit diagram of the second switching circuit according to a second embodiment of the present disclosure, and also refer to FIG. 1 and FIG. 2. In FIG. 3A, the second switch Q2 may be a diode that does not need to be controlled by the control circuit 3 to be turned on and off so that it can be naturally forward biased and reverse biased according to the voltage level. Alternatively, the second switch Q2 may also be a thyristor that still needs to be turned on and turned off by a control signal provided from the control circuit 3. In FIG. 3B, the second switch Q2 may be a metal-oxide semi-field effect transistor (MOSFET), and the second switch Q2 may be an N-type MOSFET or a P-type MOSFET, which will not be described in detail here.

Figure 4A:
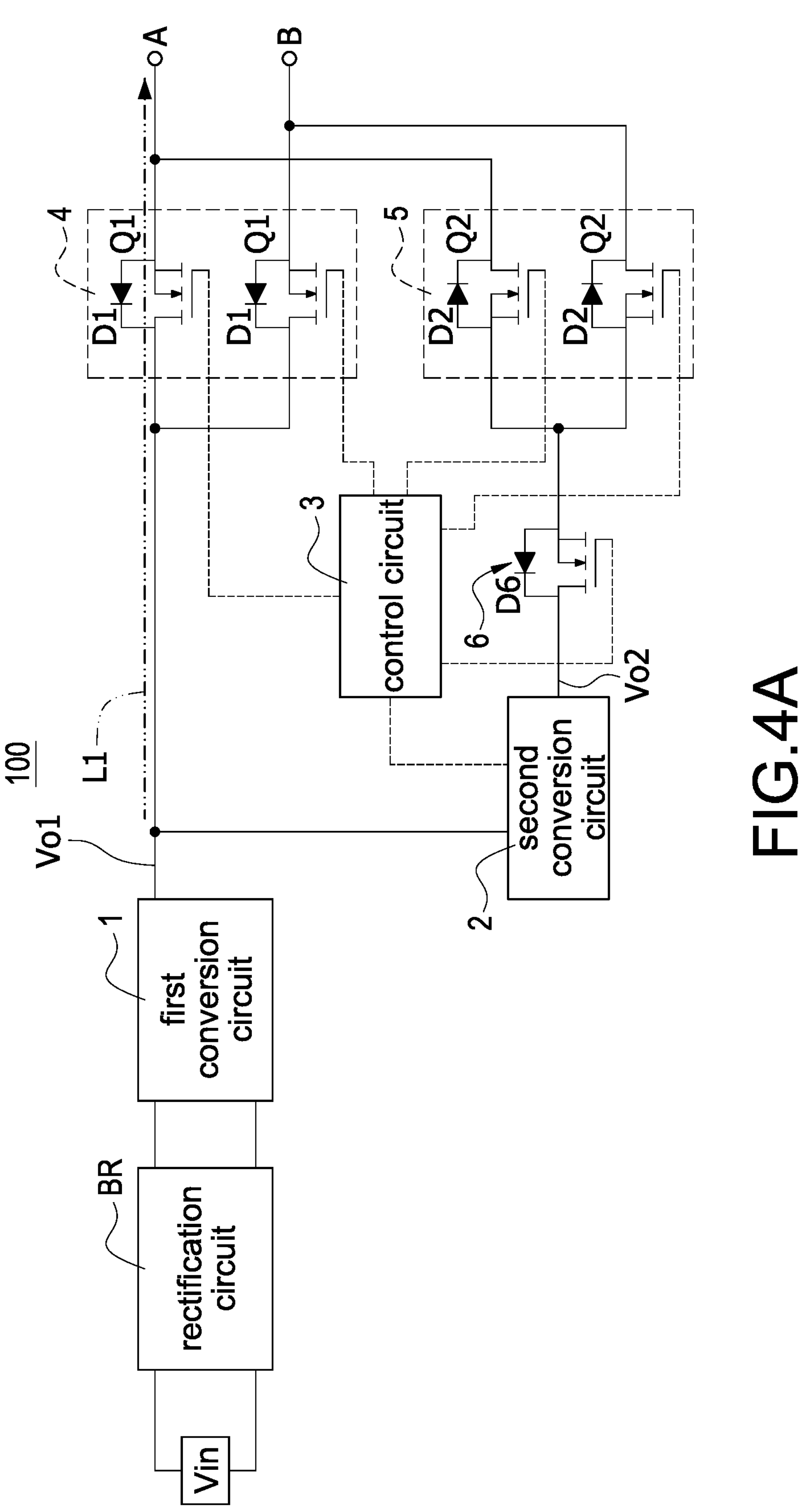
FIG. 4A to FIG. 4E are schematic diagrams of paths of providing the output voltage of the power supply according to the first embodiment to the fifth embodiment of the present disclosure respectively.
Figure 4B:
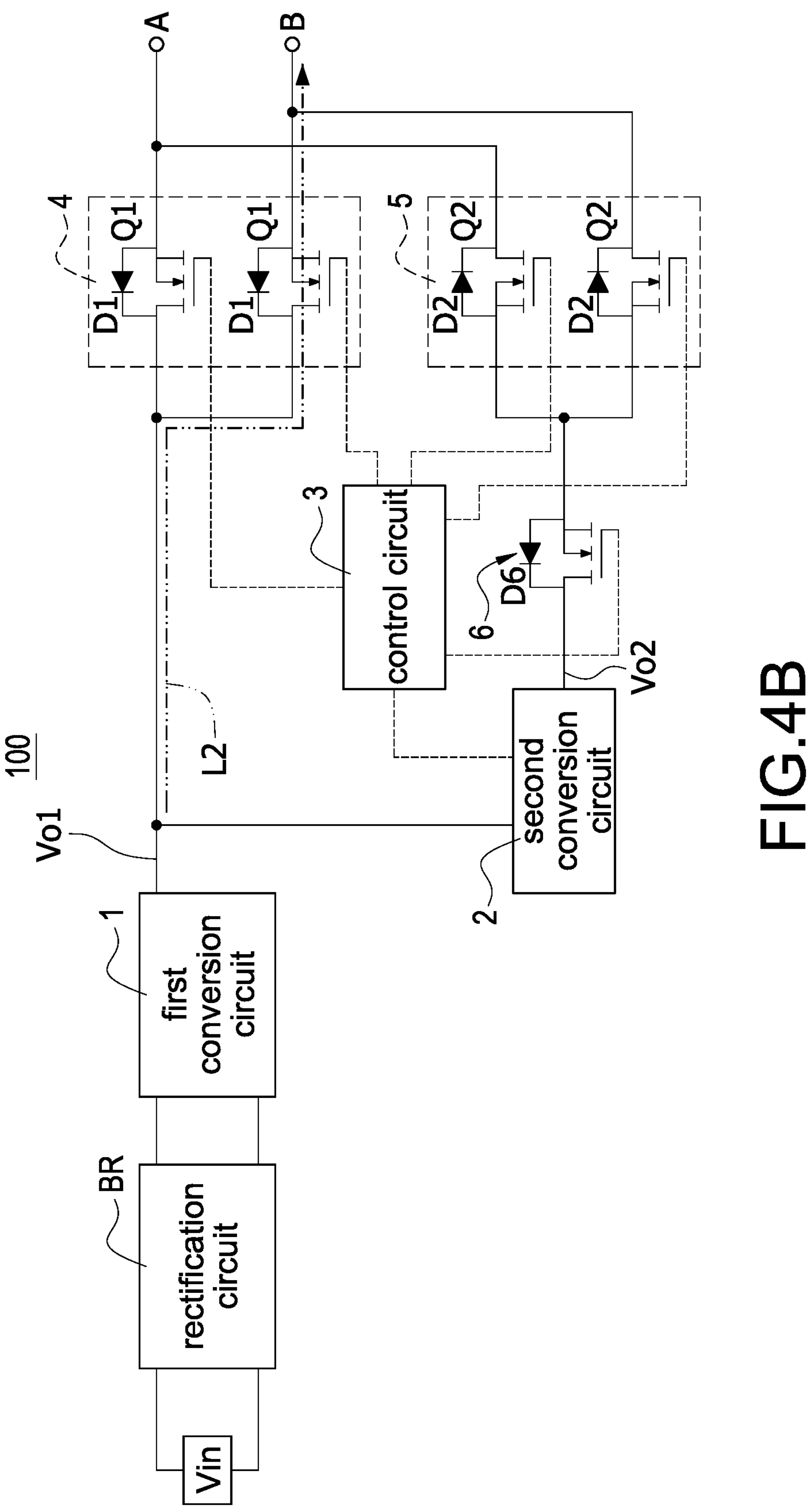

Please refer to FIG. 4A to FIG. 4E, which respectively show schematic diagrams of paths of providing the output voltage of the power supply according to the first embodiment to the fifth embodiment of the present disclosure respectively, and also refer to FIG. 1 to FIG. 3B. In particular, in FIG. 4A to FIG. 4E, the circuit structure of the power supply 100 of FIG. 1 and FIG. 2 is used as a schematic example. In FIG. 4A, the power supply 100 detects that a load 200 is connected to the first output terminal A, and realizes the voltage requirement of the load 200 after a hand-shaking communication. Therefore, the control circuit 3 controls the first conversion circuit 1 to convert the input voltage Vin into the first voltage Vo1 corresponding to the voltage requirement. Afterward, the control circuit 3 controls the first switch Q1 in the first switching circuit 4 coupled to the first output terminal A to be turned on so as to connect the path from the first conversion circuit 1 to the first output terminal A. Moreover, the control circuit 3 also controls the first switch Q1 in the first switching circuit 4 coupled to the second output terminal B to be turned off so as to disconnect the path from the first conversion circuit 1 to the second output terminal B. Therefore, the first voltage Vo1 can be provided to the load 200 coupled to the first output terminal A through the first path L1. Moreover, the control circuit 3 also controls the switching switch 6 and the two second switches Q2 of the second switching circuit 5 to be turned off so as to bidirectionally disconnect the path from the second conversion circuit 2 to the first output terminal A and the second output terminal B. Therefore, it is possible to prevent the first voltage Vo1 from flowing back to the second conversion circuit 2 or the second voltage Vo2 from being mistakenly supplied to the first output terminal A and the second output terminal B. In FIG. 4B, the operation mode is similar to that of FIG. 4A, and the only difference is that the load 200 is connected into the second output terminal B, and therefore the turned-on and turned-off of the first switch Q1 is reversed. Therefore, the first voltage Vo1 can be provided to the load 200 coupled to the second output terminal B through the second path L2.

Figure 4C:
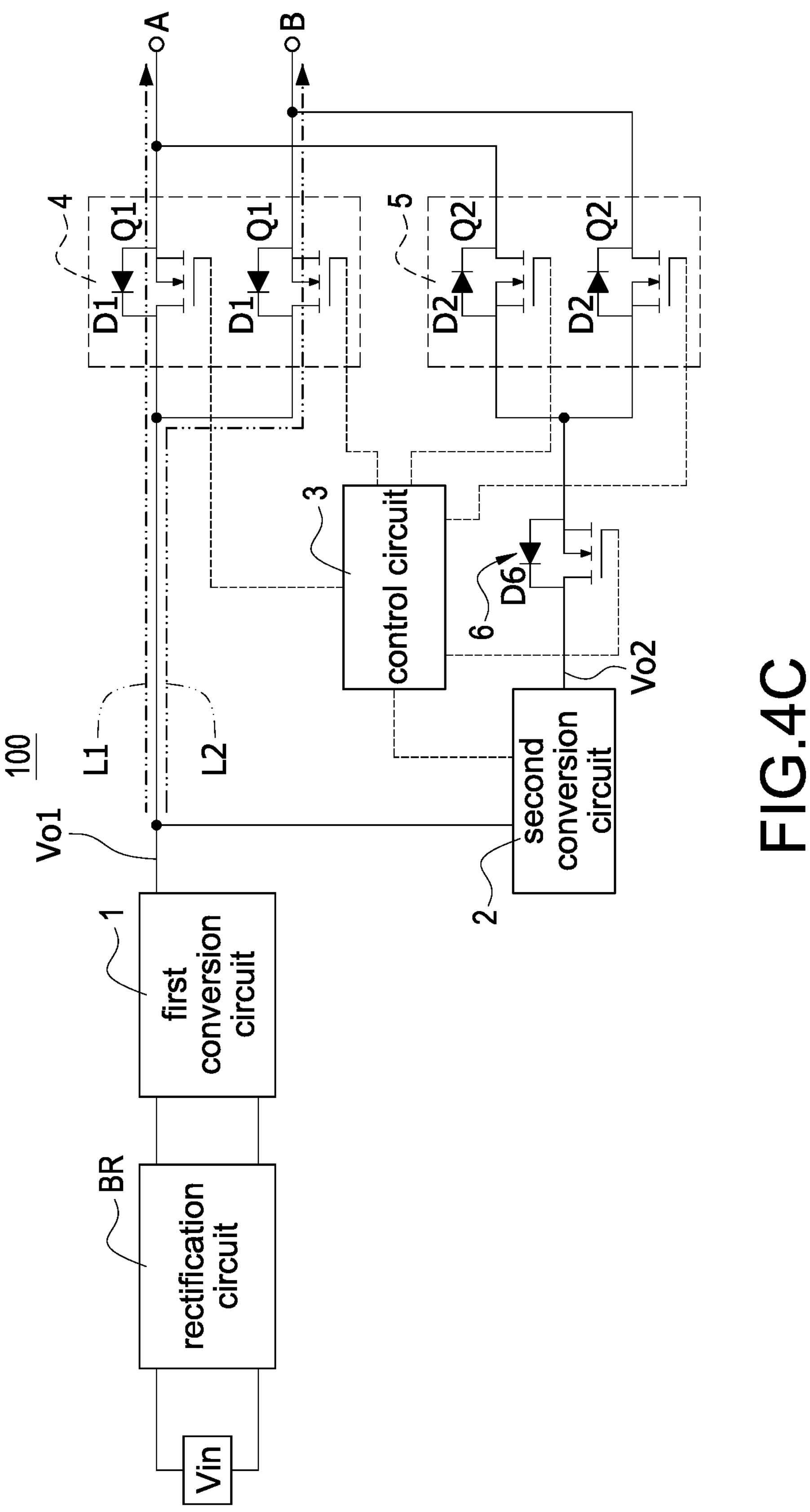

In FIG. 4C, the power supply 100 detects that one load 200 is connected to the first output terminal A, and another load 200 is also connected to the second output terminal B, and after the hand-shaking communication, the power supply 100 realizes that the voltage requirements of the two loads 200 are the same. Therefore, the control circuit 3 controls the first conversion circuit 1 to convert the input voltage Vin into the first voltage Vo1 corresponding to the voltage requirement. Afterward, the control circuit 3 controls the first switch Q1 in the first switching circuit 4 coupled to the first output terminal A to be turned on and controls the first switch Q1 in the first switching circuit 4 coupled to the second output terminal B to be turned on so as to connect the path from the first conversion circuit 1 to the first output terminal A and the path from the first conversion circuit 1 to the second output terminal B. Therefore, the first voltage Vo1 can be provided to the load 200 coupled to the first output terminal A and the load 200 coupled to the second output terminal B through the first path L1 and the second path L2 respectively. Moreover, the control circuit 3 also controls the switching switch 6 and the two second switches Q2 of the second switching circuit 5 to be turned off so as to bidirectionally disconnect the path from the second conversion circuit 2 to the first output terminal A and the path from the second conversion circuit 2 to the second output terminal B. Therefore, it is possible to prevent the first voltage Vo1 from flowing back to the second conversion circuit 2 or the second voltage Vo2 from being mistakenly supplied to the first output terminal A and the second output terminal B.

Figure 4D:
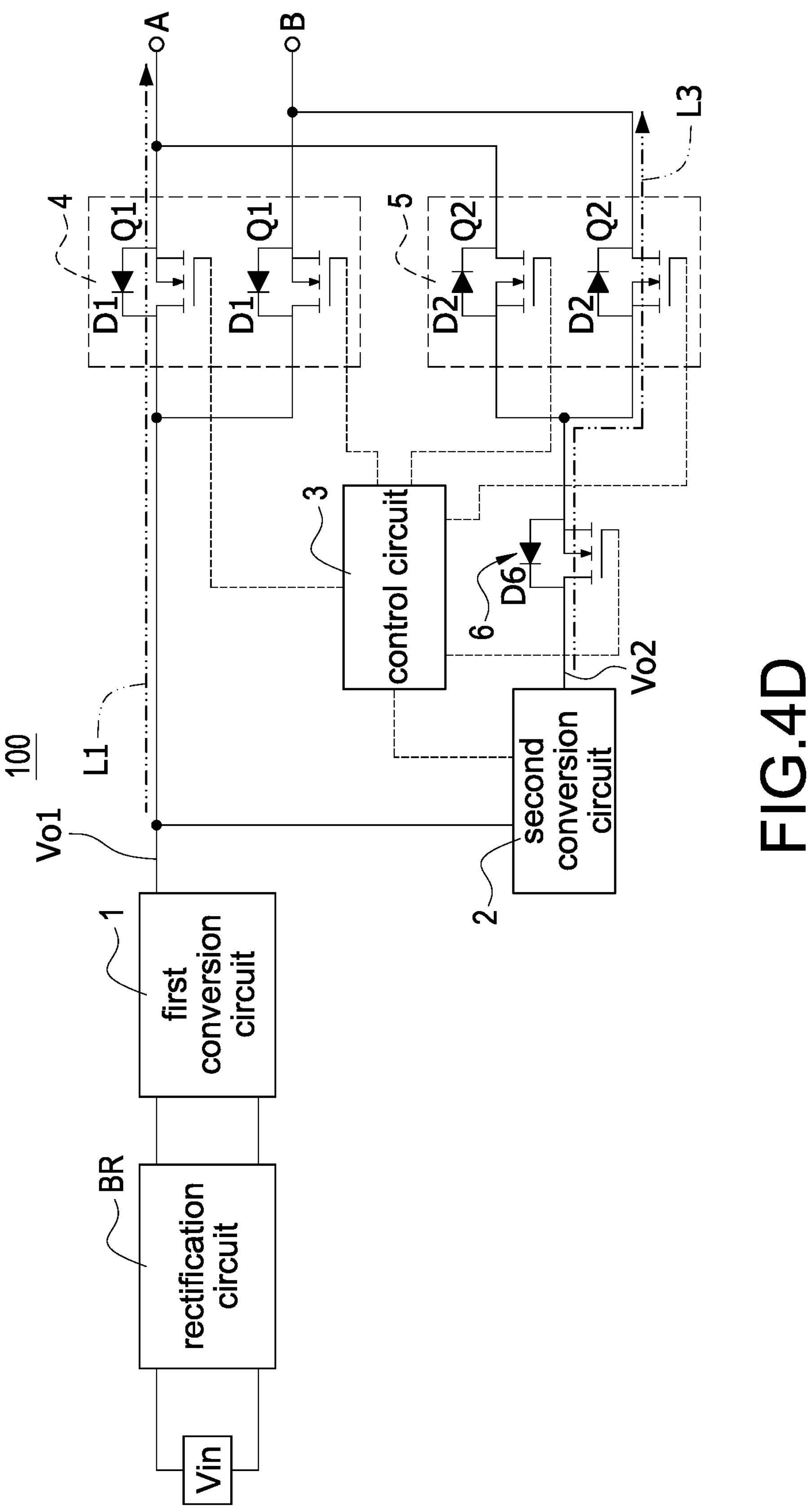

In FIG. 4D, the power supply 100 detects that one load 200 is connected to the first output terminal A, and another load 200 is also connected to the second output terminal B. After the hand-shaking communication, the control circuit 3 realizes that the voltage requirements of the two loads 200 are different, and the voltage requirement of the first output terminal A is greater than the voltage requirement of the second output terminal B. Therefore, the control circuit 3 controls the first conversion circuit 1 to convert the input voltage Vin into a first voltage Vo1 corresponding to the voltage requirement of the first output terminal A, and controls the second conversion circuit 2 to convert the first voltage Vo1 into a second voltage Vo2 corresponding to the voltage requirement of the second output terminal B. Afterward, the control circuit 3 controls the first switch Q1 in the first switching circuit 4 coupled to the first output terminal A to be turned on so as to connect the path from the first switching circuit 1 to the first output terminal A (i.e., the one with higher voltage requirement). Moreover, the control circuit 3 also controls the second switch Q2 in the second switching circuit 5 coupled to the second output terminal B to be turned on so as to connect the path from the second conversion circuit 2 to the second output terminal B (i.e., the one with lower voltage requirement). Therefore, the first voltage Vo1 can be provided to the load 200 coupled to the first output terminal A through the first path L1, and the second voltage Vo2 can be provided to the load 200 coupled to the second output terminal B through the third path L3.

Moreover, the control circuit 3 also controls the first switch Q1 in the first switching circuit 4 coupled to the second output terminal B (i.e., the one with lower voltage requirement) to be turned off so as to disconnect the second path L2 to prevent the first voltage Vo1 from being mistakenly supplied to the second output terminal B. Moreover, the control circuit 3 also controls the switching switch 6 and the two second switches Q2 in the second switch circuit 5 coupled to the first output terminal A (i.e., the one with higher voltage requirement) to be turned off so as to bidirectionally disconnect the path from the second conversion circuit 2 to the first output terminal A. Therefore, it is possible to prevent the first voltage Vo1 from flowing back to the second conversion circuit 2 or the second voltage Vo2 from being mistakenly supplied to the first output terminal A.

Figure 4E:
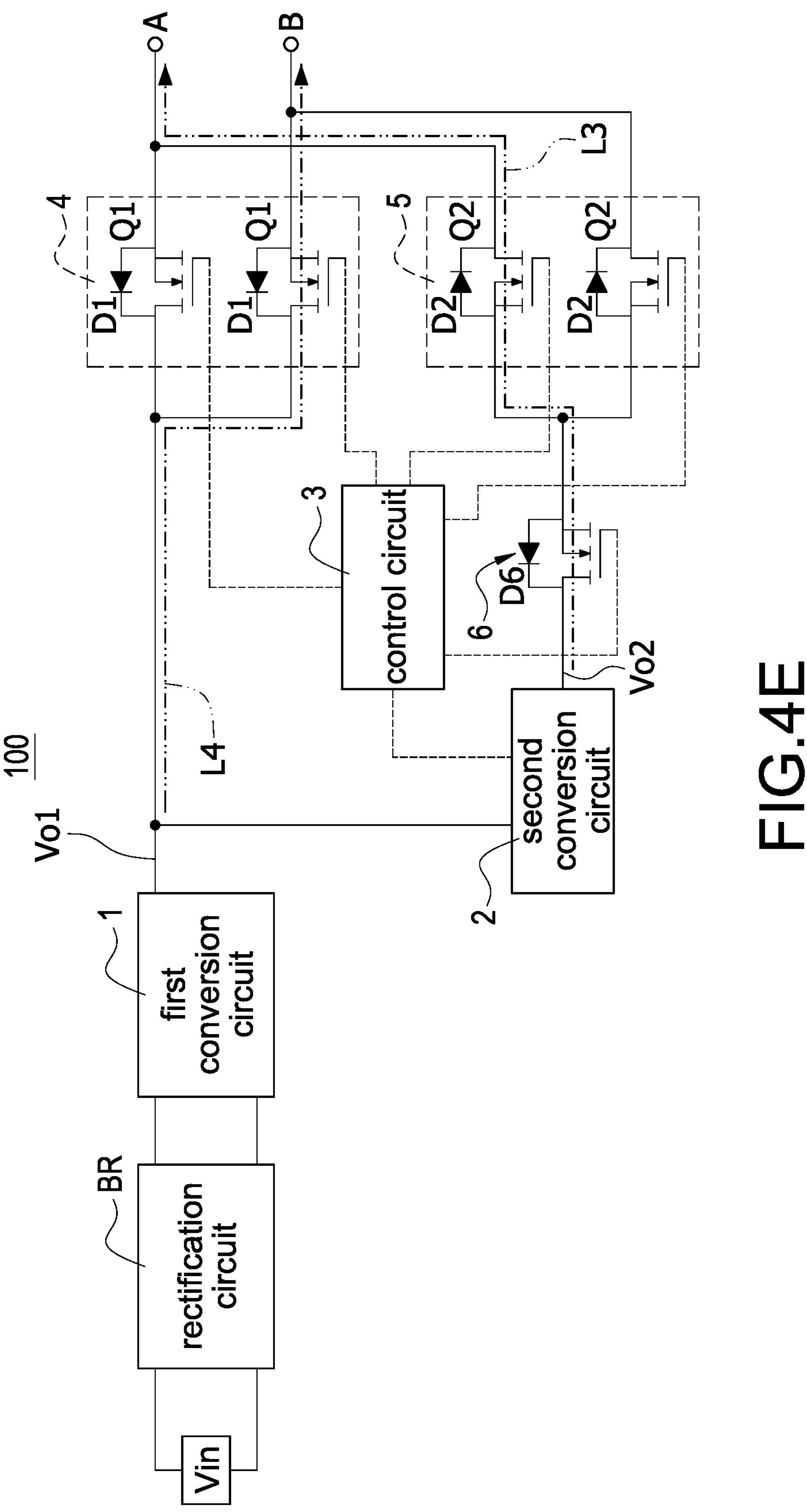

In FIG. 4E, the operation mode is similar to FIG. 4D, the only difference is that the voltage requirement of the first output terminal A is smaller than the voltage requirement of the second output terminal B, and therefore the turned-on and turned-off relationship of the first switch Q1 and the second Q2 in the first switching circuit 4 and the second switching circuit 5 is reversed. Therefore, the first voltage Vo1 can be provided to the load 200 coupled to the second output terminal B through the second path L2, and the second voltage Vo2 can be provided to the load 200 coupled to the first output terminal A through the fourth path L4.

In the embodiments shown in FIG. 4C to FIG. 4E, which mainly show path diagrams of the stable power supply state after the load 200 has been connected. However, when the loads 200 are just connected to the first output terminal A and the second output terminal B (i.e., the temporary power supply state), the control circuit 3 will adjust its power supply paths L1-L4 according to the results of the hand-shaking communication, and its main logic is as shown in FIG. 1: "the power supply 100 uses the first voltage Vo1 provided by the first conversion circuit 1 as a primary power supplier, and the second voltage Vo2 provided by the second conversion circuit 2 as a secondary power provider". Moreover, in the conventional power supply, when one load 200 is connected into any one output terminal first, and then another load 200 is connected into the other output terminal, the voltages of both output terminals need to return to the default voltage of 5V first. Afterward, after the hand-shaking communication, the voltage requirement of each output terminal is returned. Therefore, if the output power of each output terminal is insufficient, or if the load 200 does not have a battery station to supplement the power source, the load 200 will be in danger of power outage. Therefore, in order to improve this problem, the present disclosure further uses the voltage supply power switching control method to control the first conversion circuit 1 and the second conversion circuit 2 to avoid power outage due to the transient adjustment of the output voltage, and to allow the user to use more smoothly.

Specifically, it is assumed that only the first output terminal A is connected to a load 200 and the first voltage Vo1 provided by the first conversion circuit 1 is provided to the first output terminal A through the first switching circuit 4 as a stable power supply state as an example. Under this condition, when another load 200 is connected into the second output terminal B, the control circuit 3 performs a hand-shaking communication as described in FIG. 1 to realize the voltage requirement of the second output terminal B. Specifically, when the control circuit 3 realizes that a device is coupled through the detection pin of the second output terminal B, the control circuit 3 first turns on the switching switch 6 and the second switch Q2 in the second switching circuit 5 coupled to the second output terminal B so that the second conversion circuit 2 can first provide a default voltage of 5V and communicate with the load 200 coupled to the second output terminal B, and the control circuit 3 can realize the voltage requirement of the second output terminal B through the hand-shaking communication. Afterward, the control circuit 3 compares the voltage requirement of the first output terminal A with the voltage requirement of the second output terminal B to confirm what operation should be performed subsequently, and accordingly determines whether the power supplier of the second output terminal B is the first conversion circuit 1 or the second conversion circuit 2.

When the voltage requirement of the first output terminal A is higher than the voltage requirement of the second output terminal B, the control circuit 3 performs the circuit operation of FIG. 4D. Therefore, the control circuit 3 controls the first conversion circuit 1 to provide the first voltage Vo1, and controls the second conversion circuit 2 to convert the first voltage Vo1 into the second voltage Vo2 required by the load 200 coupled to the second output terminal B. Moreover, the control circuit 3 controls the power supply 100 to keep connecting the first path L1 from the first conversion circuit 1 to the first output terminal A, and to connect the third path L3 from the second conversion circuit 2 to the second output terminal B, to respectively provide the first voltage Vo1 and the second voltage Vo2 to the corresponding loads 200. Moreover, the control circuit 3 keeps disconnecting the second path L2, and bidirectionally disconnecting the fourth path L4 to prevent the output voltage from being mistakenly supplied.

When the voltage requirement of the first output terminal A is equal to the voltage requirement of the second output terminal B, the control circuit 3 performs the circuit operation of FIG. 4C. Therefore, the control circuit 3 controls the first conversion circuit 1 to provide the first voltage Vo1, and controls the power supply 100 to connect the first path L1 from the first conversion circuit 1 to the first output terminal A and the second path L2 from the first conversion circuit 1 to the second output terminal B so as to provide the first voltage Vo1 to supply power to the two loads 200.

When the voltage requirement of the first output terminal A is lower than the voltage requirement of the second output terminal B, the power supply 100 will adjust its power supply paths to perform the circuit operation of FIG. 4E according to "the power supply 100 uses the first voltage Vo1 provided by the first conversion circuit 1 as a primary power supplier, and the second voltage Vo2 provided by the second conversion circuit 2 as a secondary power provider". Therefore, the control circuit 3 controls the first conversion circuit 1 to provide the first voltage Vo1 that meets the voltage requirement of the load 200 coupled to the second output terminal B, and controls the second conversion circuit 2 to convert the first voltage Vo1 into the second voltage Vo2 required by the load 200 coupled to the first output terminal A. Moreover, the control circuit 3 controls the power supply 100 to disconnect the first path L1 from the first conversion circuit 1 to the first output terminal A, and keep bidirectionally disconnecting the third path L3 from the second conversion circuit 2 to the second output terminal B to prevent the output voltage from being mistakenly supplied. Moreover, the control circuit 3 controls the power supply 100 to connect the second path L2 from the first conversion circuit 1 to the second output terminal B, and connect the fourth path L4 from the second conversion circuit 2 to the first output terminal A, to respectively provide the first voltage Vo1 and the second voltage Vo2 to the corresponding loads 200.

In addition, when only the second output terminal B is connected to the load 200, and the first voltage Vo1 provided by the first conversion circuit 1 is provided to the second output terminal B through the first switching circuit 4 as a stable power supply state, its operation logic is the same, and the operation of the first switch Q1 and the second switch Q2 is opposite to the above example and will not be described again here. Therefore, from the above-mentioned operation modes of FIG. 4A to FIG. 4E, the operation timings in Table 1 to Table 3 below can be sorted out. Specifically, in Table 1 to Table 3, the timing ranges from 0 to T3, and the closer to 0, the earlier the operation is performed. In addition, in order to conveniently illustrate which switch performs the turned-on and turned-off operations, the first switch Q1 and the second switch Q2 shown in FIG. 4A to FIG. 4E are represented by the directions from the first output terminal A to the second output terminal B as Q1-1, Q1-2, Q2-1, and Q2-2 to avoid confusion about who is doing the operation.

In Table 1 below, the voltage requirement of the load 200 connected to the first output terminal A is 20V, and the voltage requirement of the load 200 connected to the second output terminal B is also 20V. Moreover, after the first output terminal A is first connected to the load 200 (timing sequence T1), the second output terminal B is then connected to the load 200 (timing sequence T2). Moreover, after the load 200 is connected to the second output terminal B, the load 200 connected to the first output terminal A is removed (timing sequence T3).

TABLE 1

| | first output terminal A | second output terminal B | first voltage Vo1 | switch Q1-1 | switch Q1-2 | second voltage Vo2 | switch Q2-1 | switch Q2-2 | switching switch 6 |
|---|---|---|---|---|---|---|---|---|---|
| 0-T1 | the load is not connected | the load is not connected | 5 V | off | off | 0 V | off | off | off |
| T1 | 5 V | the load is not connected | 5 V | on | off | 0 V | off | off | off |
| | 20 V | the load is not connected | 20 V | on | off | 0 V | off | off | off |
| T2 | 20 V | 5 V | 20 V | on | off | 5 V | on | off | off |
| | 20 V | 20 V | 20 V | on | on | 5 V | on | off | off |
| | 20 V | 20 V | 20 V | on | on | 0 V | off | off | off |
| T3 | the load is removed | the load is removed | 20 V | off | on | 0 V | off | off | off |

In Table 2 below, the voltage requirement of the load 200 connected to the first output terminal A is 20V, and the voltage requirement of the load 200 connected to the second output terminal B is 9V. Moreover, after the first output terminal A is first connected to the load 200 (timing sequence T1), the second output terminal B is then connected to the load 200 (timing sequence T2). Moreover, after the load 200 is connected to the second output terminal B, the load 200 connected to the first output terminal A is removed (timing sequence T3).

TABLE 2

| | first output terminal A | second output terminal B | first voltage Vo1 | switch Q1-1 | switch Q1-2 | second voltage Vo2 | switch Q2-1 | switch Q2-2 | switching switch 6 |
|---|---|---|---|---|---|---|---|---|---|
| 0-T1 | the load is not connected | the load is not connected | 5 V | off | off | 0 V | off | off | off |
| T1 | 5 V | the load is not connected | 5 V | on | off | 0 V | off | off | off |
| | 20 V | the load is not connected | 20 V | on | off | 0 V | off | off | off |
| T2 | 20 V | 5 V | 20 V | on | off | 5 V | on | off | on |
| | 20 V | 9 V | 20 V | on | off | 9 V | on | off | on |
| T3 | the load is removed | 9 V | 20 V | off | off | 9 V | on | off | on |
| | the load is removed | 9 V | 9 V | off | off | 9 V | on | off | on |
| | the load is removed | 9 V | 9 V | off | on | 9 V | on | off | on |
| | the load is removed | 9 V | 9 V | off | on | 0 V | off | off | off |

In Table 3 below, the voltage requirement of the load 200 connected to the first output terminal A is 9V, and the voltage requirement of the load 200 connected to the second output terminal B is 20V. Moreover, after the first output terminal A is first connected to the load 200 (timing sequence T1), the second output terminal B is then connected to the load 200 (timing sequence T2). Moreover, not long after the load 200 is connected to the second output terminal B, the load 200 connected to the second output terminal B is removed (timing sequence T3).

TABLE 3

| | first output terminal A | second output terminal B | first voltage Vol | switch Q1-1 | switch Q1-2 | second voltage Vo2 | switch Q2-1 | switch Q2-2 | switching switch 6 |
|---|---|---|---|---|---|---|---|---|---|
| 0-T1 | the load is not connected | the load is not connected | 5 V | off | off | 0 V | off | off | off |
| T1 | 5 V | the load is not connected | 5 V | on | off | 0 V | off | off | off |
| | 9 V | the load is not connected | 9 V | on | off | 0 V | off | off | off |
| T2 | 9 V | 5 V | 9 V | on | off | 5 V | on | off | on |
| | 9 V | 9 V | 9 V | on | off | 9 V | on | off | on |
| | 9 V | 9 V | 9 V | off | on | 9 V | on | on | off |
| | 9 V | 20 V | 20 V | off | on | 9 V | on | on | off |
| T3 | 9 V | the load is removed | 20 V | off | off | 9 V | on | on | off |
| | 9 V | the load is removed | 9 V | off | off | 9 V | on | on | off |
| | 9 V | the load is removed | 9 V | on | off | 9 V | on | on | off |
| | 9 V | the load is removed | 9 V | on | off | 0 V | off | off | off |

the connected load 200. Moreover, although the present disclosure takes as an example that the first output terminal A is first connected to the load 200, and then the second output terminal B is connected to the load 200, if the load 200 is connected to the second output terminal B first, and then the load 200 is connected to the first output terminal A, the operation timing is the same as the above Table 1 to Table 3, and the difference is that the power suppliers of first voltage Vo1 and the second voltage Vo2 are exactly opposite. Moreover, the operations of switches Q1-1, Q1-2, Q2-1, Q2-2, 6 are exactly opposite, and will not be described again here.

It can be seen from the above Table 1 to Table 3 that when the load 200 is connected to the output terminals A, B, the power supply 100 will communicate with the load at the default voltage (5V). After confirming the voltage requirement of the load, it is decided to provide the first voltage Vo1 or the second voltage Vo2 to supply power to the load, and by operating the corresponding switches Q1-1, Q1-2, Q2-1, Q2-2, 6 to provide a suitable power path to supply power to the connected load 200.

Figure 5A:
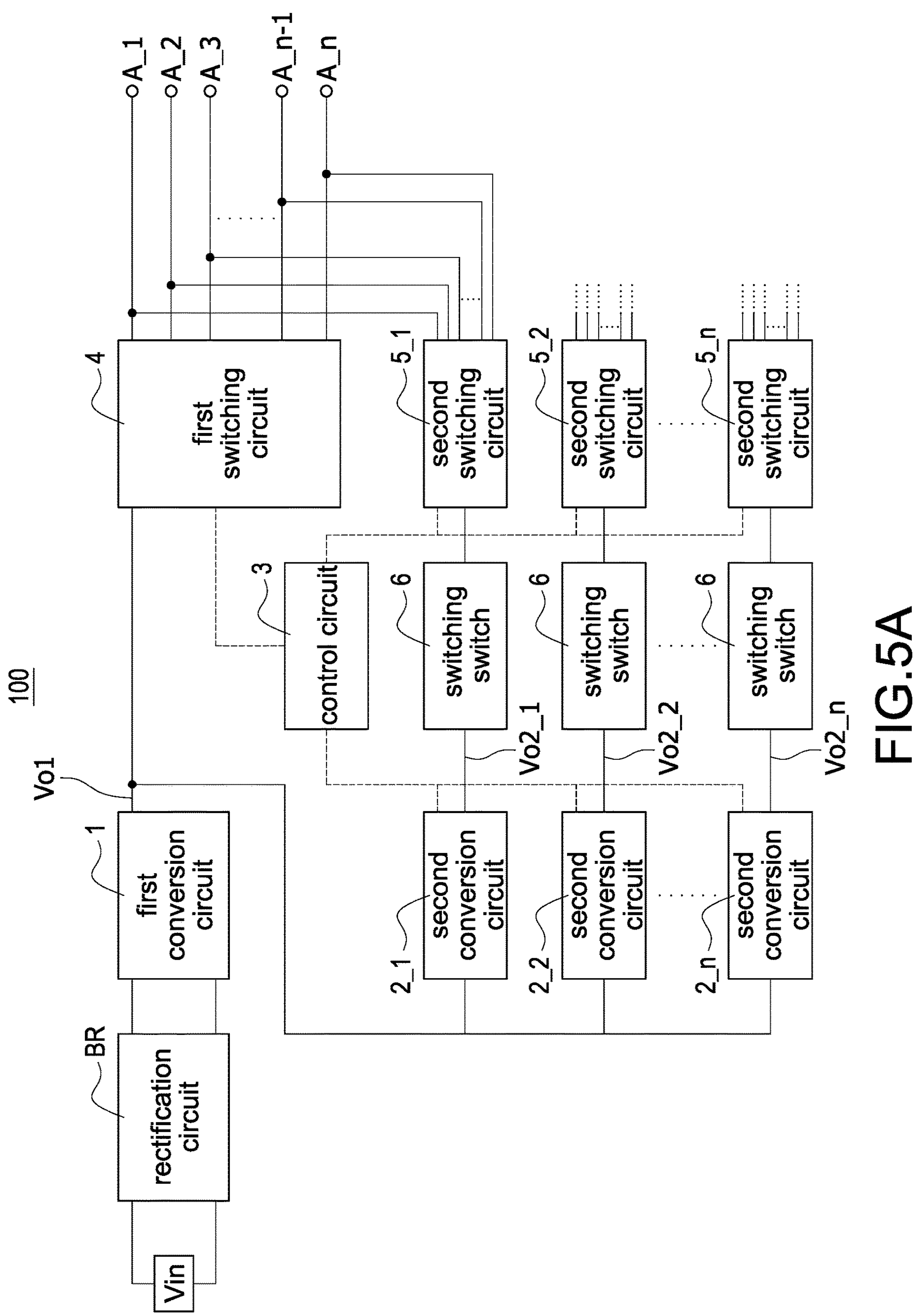
FIG. 5A is a block circuit diagram of the power supply according to a second embodiment of the present disclosure.

Please refer to FIG. 5A, which shows a block circuit diagram of the power supply according to a second embodiment of the present disclosure, and also refer to FIG. 1 to FIG. 4E. The circuit difference between the power supply 100 in the embodiment of FIG. 5A and the power supply 100 in FIG. 1 is that the power supply 100 includes a plurality of output terminals A_1 to A_n. Therefore, the power supply 100 correspondingly includes a plurality of second conversion circuits 2_1 to 2_*n*, a plurality of second switching circuits 5, 5_1 to 5_*n*, and a plurality of switching switches 6 based on the plurality of output terminals A_1 to A_n. The second conversion circuits 2_1 to 2_*n* respectively convert the first voltage Vo1 into the second voltages Vo2_1 to Vo2_*n*, and the voltage levels of the second voltages Vo2_1 to Vo2_*n* may be the same or different. Each second switching circuit 2_1 to 2_*n* is coupled to an output terminal A_1 to A_n through a second switching circuit 5_1 to 5_*n* and a switching switch 6 respectively, and therefore the number of the second switching circuits 5_1 to 5_*n* and the switching switches 6 will correspond to the number of the second switching circuits 2_1 to 2_*n*. Therefore, it is assumed that the number of output terminals A_1 to A_n is five, the number of first switches Q1 inside the first switching circuit 4 is five, and the number of second switches Q2 inside each second switching circuit 5_1 to 5_*n* is also is five.

Basically, the operation mode of the power supply 100 in FIG. 5A is the same as that in FIG. 1, and its detailed operation mode and the formed paths L1 to L4 are similar to those in FIG. 2 to FIG. 4E. Therefore, the power supply 100 will adjust its power supply paths to perform the circuit operation similar to FIG. 1 according to "the power supply 100 uses the first voltage Vo1 provided by the first conversion circuit 1 as a primary power supplier, and the second voltage Vo2_1 to Vo2_*n* provided by the second conversion circuit 2 as a secondary power provider". Therefore, the operation mode, detailed movements and possible paths of the power supply 100 in FIG. 5A can be inferred from the disclosures in FIG. 1 to FIG. 4E, and will not be described again here. Moreover, the achievable functions are similar to those recorded in FIG. 1 to FIG. 4E, with the bidirectional disconnection and the ability to prevent power outages due to transient adjustments in the output voltage.

Moreover, the difference in the operation mode between the power supply 100 of the embodiment of FIG. 5A and the power supply 100 of FIG. 1 is that since the power supply 100 of FIG. 5A includes a plurality of second conversion circuits 2_1 to 2_*n*, when the second conversion circuits 2_1 to 2_*n* respectively convert the first voltage Vo1 into the second voltages Vo2_1 to Vo2_*n* of different voltage level. In addition to the load 200 with the highest voltage requirement (that is, the one with the highest voltage requirement) being supplied with the first voltage Vo1 by the first conversion circuit 1, the control circuit 3 further provides the second voltages Vo2_1 to Vo2_*n* of different voltage levels to the corresponding output terminals A_1 to A_n by controlling the switching switch 6 and the second switching circuits 5_1 to 5_*n* so as to supply power to the load 200 whose voltage requirement is lower than the one with the highest voltage requirement (i.e., the one with the bulk requirement). In particular, the second conversion circuits 2_1 to 2_*n* can be arranged in sequence according to the magnitude of the second voltages Vo2_1 to Vo2_*n*, that is, the second voltage Vo2_1 converted by the second conversion circuit 2_1 must be greater than or equal to the second voltage Vo2_*n* converted by the second conversion circuit 2_*n*.

Specifically, when the second conversion circuits 2_1 to 2_*n* can respectively convert the first voltage Vo1 into the two voltages Vo2_1 to Vo2_*n* of different voltage levels, the control circuit 3 correspondingly controls the second conversion circuit 2 to convert the second voltages Vo2_1 to Vo2_*n* of different voltage levels. Moreover, by controlling the switching switch 6 and the second switching circuits 5_1 to 5_*n* to connect corresponding paths, the second voltages Vo2_1 to Vo2_*n* that meet the requirements of the load 200 with lower voltage requirements are provided to the corresponding output terminals A_1 to A_n. Taking FIG. 5A as an example, when the requirement voltages of the load 200 coupled to the output terminals A_1, A_2, A_3 are 9V, 3V, and 5V respectively, the first conversion circuit 1 provides the first voltage Vo1 of 9V, and the control circuit 3 controls the first switching circuit 4 to connect the path from the first conversion circuit 1 to the output terminal A_1 to provide the first voltage Vo1 of 9V to the output terminal A_1.

The second conversion circuit 2_1 provides the second voltage Vo2_1 of 5V, and the control circuit 3 controls the second switching circuit 5_1 to connect the path from the second conversion circuit 2_1 to the output terminal A_3 to provide the second voltage Vo2_1 of 5V to the output terminal A_3. The second conversion circuit 2_2 provides the second voltage Vo2_2 of 3V, and the control circuit 3 controls the second switching circuit 5_2 to connect the path from the second conversion circuit 2_2 to the output terminal A_2 to provide the second voltage Vo2_2 of 3 V to the output terminal A_2. Therefore, the power supply 100 can respond to different loads 200 and accordingly provide requirement voltages that meets the requirements of the loads 200.

In addition, as mentioned in above example of FIG. 5A, when another load 200 is connected into the output terminal A_n, its operation mode is similar to that of FIG. 4C to FIG. 4E, that is, the control circuit 3 also first controls the second conversion circuit 2_*n* to provide a default voltage of 5V, and then communicates with the load 200 at the output terminal A_n. Afterward, according to the requirement voltage of the output terminal A_n, the voltage supplied by the first conversion circuit 1 and the second conversion circuit 2_1, 2_2 to 2_*n* is adjusted. It is assumed that the requirement voltage of the load 200 at the output terminal A_n is 6V. The power supply 100 instead provides the second voltage Vo2_1 of 6V provided by the second conversion circuit 2_1, and the control circuit 3 controls the second switching circuit 5_1 to connect the path from the second conversion circuit 2_1 to the output terminal A_n to provide the second voltage Vo2_1 of 6V to the output terminal A_n. Afterward, the second conversion circuit 2_2 provides a second voltage Vo2_2 of 5V, and the second conversion circuit 2_*n* provides a second voltage Vo2_*n* of 3V, and the control circuit 3 connects corresponding paths to provide the second voltages Vo2_2, Vo2_*n* to the corresponding output terminals A_2, A_3.

Figure 5B:
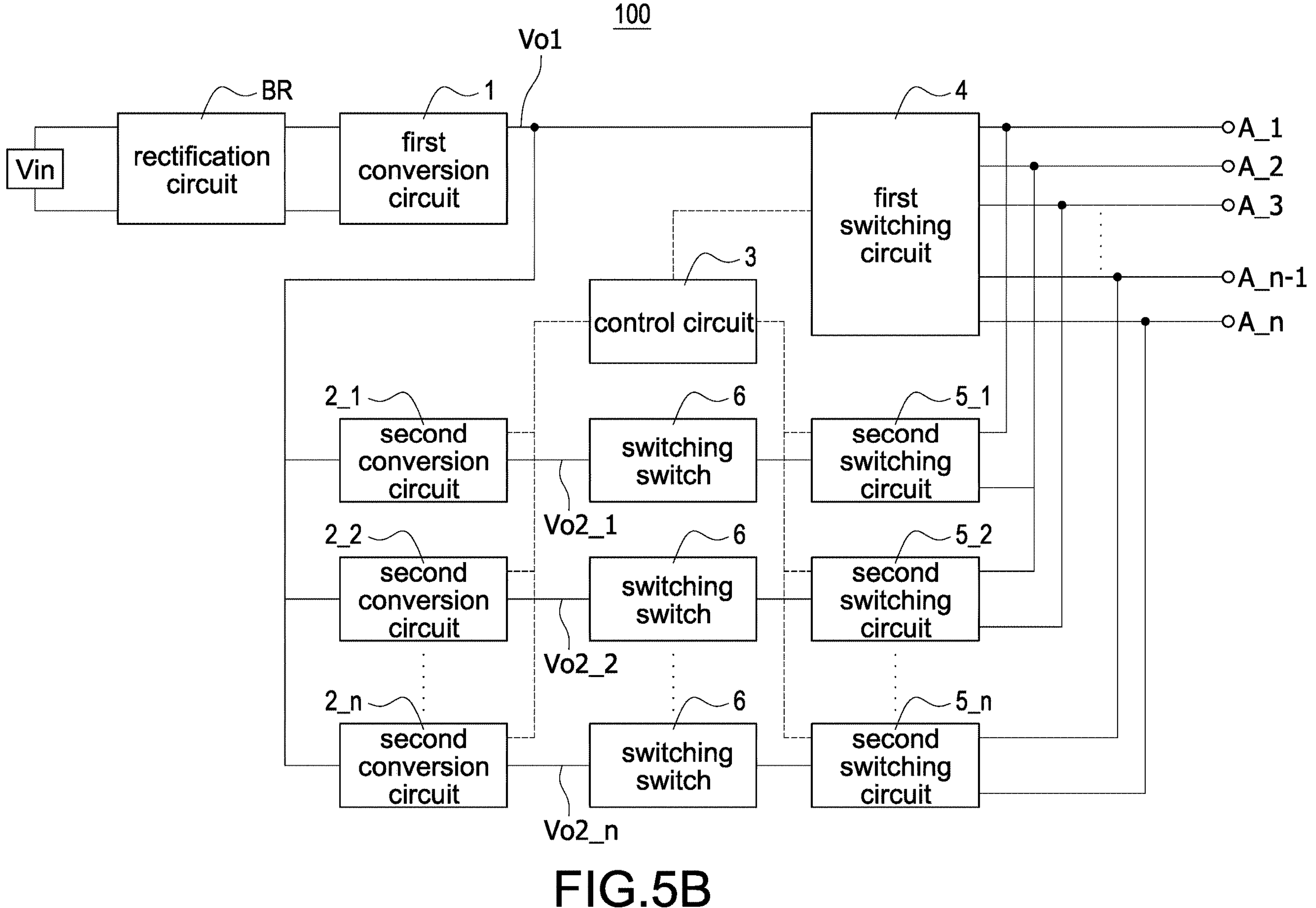
FIG. 5B is a block circuit diagram of the power supply according to a third embodiment of the present disclosure.

Please refer to FIG. 5B, which shows a block circuit diagram of the power supply according to a third embodiment of the present disclosure, and also refer to FIG. 1 to FIG. 5A. The circuit difference between the power supply 100 in the embodiment of FIG. 5B and the power supply 100 in FIG. 5A is that each output terminal A_1 to A_n of the power supply 100 in FIG. 5B is coupled to less than two second switching circuits 5_1 to 5_*n*. Taking the output terminal A_2 as an example, it is coupled to the second switching circuit 5_1 and the second switching circuit 5_2, and taking the output terminal A_1 as an example, it is coupled to the first switching circuit 4 and the second switching circuit 5_1. Therefore, it is assumed that the number of the output terminals A_1 to A_n is the same as FIG. 5A (five), the number of first switches Q1 inside the first switching circuit 4 is the same as FIG. 5A (five), but the number of second switches Q2 inside each second switching circuit 5_1 to 5_*n* is two. Therefore, the characteristic of the power supply 100 in FIG. 5B is that each second conversion circuit 2_1 to **2_*n* only needs to be responsible for supplying some of the output terminals A_1** to A_n.

Taking the output terminal A_2 as an example, the second conversion circuits 2_1, 2_2 are used, and the second switching circuits 5_1, 5_2 for switching the second voltages Vo2_1, Vo2_2 are used. Therefore, the power supply source of the output terminal A_2 is the first voltage Vo1, the second voltages Vo2_1, Vo2_2, and the control circuit 3 can form a pair of power supply paths of the output terminals by controlling the first switching circuit 4, the switching switch 6, and the second switching circuits 5_1, 5_2. Therefore, the power supply 100 of FIG. 5B can use fewer second switches Q2 (two) to achieve similar effects to that of FIG. 5A. In one embodiment, since there is a plurality of input terminals A_1 to A_n in FIG. 5A and FIG. 5B, they include a variety of possible situations. For example, the requirement voltage of some or one of the output terminals A_1 to A_n is 20V, and the requirement voltage of another one or some of the other output terminals A_1 to A_n is 5V or 3V. Therefore, the first voltage Vo1 must be provided to the output terminals A_1 to A_n whose requirement voltage is 20V, and the second conversion circuits 2_1 to **2_*n* must adjust which one should be supplied power. The logic of FIG. 5A should be provided by the second conversion circuits 2_1 to 2_2, and the logic of FIG. 5B needs to confirm which output terminal A_1 to A_n is required to make the corresponding switch. Therefore, in summary, since there are many possible situations and all have corresponding operation methods, it can be inferred based on the operation logic of FIG. 1 to FIG. 5**B, and will not be repeated here.

In one embodiment, the power supply 100 can be also systematically integrated, that is, the first conversion circuit 1, the second conversion circuit 2, the control circuit 3, the first switching circuit 4, the second switching circuit 5, and the switching switch 6 can be integrated into a single integrated circuit (IC). Therefore, the single IC can receive the DC voltage Vdc to perform the power conversion and multi-voltage level output operations of the above-mentioned FIG. 1 to FIG. 5B. In one embodiment, the second conversion circuit 2, the control circuit 3, the first switching circuit 4, the second switching circuit 5, and the switching switch 6 can be integrated into a single integrated circuit (IC) so that the first conversion circuit 1 is coupled to the single IC to provide the first voltage Vo1 so as to perform the power conversion and multi-voltage level output operations of the above-mentioned FIG. 1 to FIG. 5B. In one embodiment, the control circuit 3, the first switching circuit 4, the second switching circuit 5, and the switching switch 6 can be integrated into a single integrated circuit (IC) so that the first conversion circuit 1 and the second conversion circuit 2 are coupled to the single IC to perform the multi-voltage level output operations of the above-mentioned FIG. 1 to FIG. 5B.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A power supply configured to provide two power outputs, the power supply comprising:

a first conversion circuit configured to convert an input voltage into a first voltage;

a second conversion circuit coupled to the first conversion circuit, and the second conversion circuit configured to convert the first voltage into a second voltage;

a control circuit coupled to the first conversion circuit and the second conversion circuit, a first switching circuit coupled to the control circuit, the first conversion circuit, a first output terminal, and a second output terminal;

a second switching circuit coupled to the control circuit, the first output terminal, and the second output terminal; and a switching switch coupled to the control circuit, the second conversion circuit, and the second switching circuit;

wherein when the control circuit receives a first voltage requirement of the first output terminal or a second voltage requirement of the second output terminal, the control circuit is configured to control the first switching circuit to connect a path from the first conversion circuit to the first output terminal when the first voltage requirement is received, and disconnect a path from the first conversion circuit to the second output terminal, and the control circuit controls the switching switch and the second switching circuit to disconnect a path from the second conversion circuit to the first output terminal and a path from the second conversion circuit to the second output terminal so as to prevent the first voltage from flowing back to the second conversion circuit or the second voltage from being mistakenly supplied to the first output terminal and the second output terminal, and wherein when the first conversion circuit is configured to provide the first voltage to one of the first output terminal and the second output terminal through the first switching circuit, and the control circuit determines that the other of the first output terminal and the second output terminal is connected to a load, the control circuit is configured to control the second conversion circuit to provide a default voltage through the switching switch and the second switching circuit to the other of the first output terminal and the second output terminal to communicate to determine the first voltage requirement or the second voltage requirement, and therefore to decide that the first conversion circuit or the second conversion circuit is configured to supply power to the other of the first output terminal and the second output terminal.

2. The power supply as claimed in claim 1, wherein when the first voltage requirement is equal to the second voltage requirement, the control circuit is configured to control the first switching circuit to connect the path from the first conversion circuit to the first output terminal and connect the path from the first conversion circuit to the second output terminal, and control the switching switch and the second switching circuit to bidirectionally disconnect the path from the second conversion circuit to the first output terminal and the path from the second conversion circuit to the second output terminal.

3. The power supply as claimed in claim 1, wherein when the first voltage requirement is greater than the second voltage requirement, the control circuit is configured to control the first switching circuit to connect the path from the first conversion circuit to the first output terminal and to disconnect the path from the first conversion circuit to the second output terminal, and control the switching switch and the second switching circuit to connect the path from the second conversion circuit to the second output terminal and to disconnect the path from the second conversion circuit to the first output terminal.

4. The power supply as claimed in claim 1, wherein the first voltage is provided to the first output terminal and the load is connected to the second output terminal; when the second voltage requirement is equal to the first voltage requirement, the control circuit is configured to control the first switching circuit to connect the path from the first conversion circuit to the first output terminal and connect the path from the first conversion circuit to the second output terminal, and control the switching switch and the second switching circuit to keep bidirectionally disconnecting the path from the second conversion circuit to the first output terminal and disconnecting the path from the second conversion circuit to the second output terminal.

5. The power supply as claimed in claim 1, wherein the first voltage is provided to the first output terminal and the load is connected to the second output terminal; when the first voltage requirement is equal to the second voltage requirement, the control circuit is configured to control the first switching circuit to keep connecting the path from the first conversion circuit to the first output terminal and control the switching switch and the second switching circuit to keep disconnecting the path from the second conversion circuit to the first output terminal, and control the first switching circuit to keep disconnecting the path from the first conversion circuit to the second output terminal and control the switching switch and the second switching circuit to connect the path from the second conversion circuit to the second output terminal.

6. The power supply as claimed in claim 1, wherein the first voltage is provided to the first output terminal and the load is connected to the second output terminal; when the first voltage requirement is less than the second voltage requirement, the control circuit is configured to control the first switching circuit to disconnect the path from the first conversion circuit to the first output terminal and control the switching switch and the second switching circuit to connect the path from the second conversion circuit to the first output terminal, and control the first switching circuit to connect the path from the first conversion circuit to the second output terminal and control the switching switch and the second switching circuit to keep disconnecting the path from the second conversion circuit to the second output terminal.

7. The power supply as claimed in claim 1, wherein the first switching circuit comprises:

- a plurality of first switches coupled to the first conversion circuit and the control circuit, and respectively coupled to the first output terminal and the second output terminal,
- wherein junction diodes of the plurality of first switches are arranged in a reverse-biased direction from the first conversion circuit to the first output terminal and the second output terminal.

8. The power supply as claimed in claim 1, wherein the second switching circuit comprises:

- a plurality of second switches coupled to the switching switch and the control circuit, and respectively coupled to the first output terminal and the second output terminal,
- wherein junction diodes of the second switches are arranged in a forward-biased direction from the switching switch to the first output terminal and the second output terminal, and a junction diode of the switching switch is arranged in a reverse-biased direction from the second conversion circuit to the plurality of second switches.

9. A power supply configured to provide a plurality of power outputs, and the power supply comprising:

- a first conversion circuit configured to convert an input voltage into a first voltage;
- a plurality of second conversion circuits coupled to the first conversion circuit, and configured to convert the first voltage into a plurality of second voltages;
- a control circuit coupled to the first conversion circuit and the plurality of second conversion circuits;
- a first switching circuit coupled to the control circuit, the first conversion circuit, and a plurality of output terminals;
- a plurality of second switching circuits coupled to the control circuit and the plurality of output terminals; and
- a plurality of switching switches coupled to the control circuit, and correspondingly coupled to the plurality of second conversion circuits and the plurality of second switching circuits,
- wherein when the control circuit receives a voltage requirement of one of the plurality of output terminals, the control circuit is configured to control the first switching circuit to connect a path from the first conversion circuit to the output terminal, and disconnect paths from the first conversion circuit to the remaining output terminals, and control the switching switches and the plurality of second switching circuits to bidirectionally disconnect the paths from the plurality of second conversion circuits to the output terminals so as to prevent the first voltage from flowing back to the plurality of second conversion circuits or the plurality of second voltages from being mistakenly supplied to the output terminals, and
- wherein when the first conversion circuit is configured to provide the first voltage to at least one of the plurality of output terminals through the first switching circuit, and the control circuit realizes at least another of the plurality of output terminals is connected to a load, the control circuit is configured to control the plurality of second conversion circuits to provide a default voltage to the at least another of the plurality of output terminals through the plurality of switching switches and the plurality of second switching circuits to communicate to realize the voltage requirement of the at least another of the plurality of output terminals, and therefore to decide that the first conversion circuit is or the plurality of second conversion circuits are configured to supply power to the at least another of the plurality of output terminals.

10. The power supply as claimed in claim 9, wherein when the voltage requirements are equal, the control circuit is configured to control the first switching circuit to connect the paths from the first conversion circuit to the plurality of output terminals, and control the plurality of switching switches and the plurality of second switching circuits to bidirectionally disconnect the paths from the plurality of second conversion circuits to the plurality of output terminals.

11. The power supply as claimed in claim 10, wherein the plurality of output terminals comprise a plurality of output terminals having voltage requirements being less than the highest voltage requirement, and when the voltage requirements are not equal, the control circuit is configured to correspondingly control the plurality of second conversion circuits to convert the plurality of second voltages with different voltage levels, and control the plurality of switching switches and the plurality of second switching circuits to connect the corresponding paths so as to provide the second voltages with different voltage levels to the plurality of output terminals having voltage requirements being less than the highest voltage requirement.

12. The power supply as claimed in claim 9, wherein when the voltage requirements are not equal, the control circuit is configured to control the first switching circuit to connect the path from the first conversion circuit to the output terminal having a highest voltage requirement and to disconnect the path from the first conversion circuit to the output terminal having a voltage requirement being less than the highest voltage requirement, and control the plurality of switching switches and the plurality of second switching circuits to correspondingly connect the path from the plurality of second conversion circuits to the output terminal having the voltage requirement being less than the highest voltage requirement and to disconnect the path from the plurality of second conversion circuits to the output terminal having the highest voltage requirement so as to correspondingly provides the plurality of second voltages to the output terminal having the voltage requirement being less than the highest voltage requirement.

13. The power supply as claimed in claim 9, wherein the voltage requirement of the at least another of the plurality of output terminals is equal to the voltage requirement of the at least one of the plurality of output terminals, the control circuit is configured to control the first switching circuit to connect the path from the first conversion circuit to the at least another of the plurality of output terminals and connect the path from the first conversion circuit to the at least one of the plurality of output terminals, and control the plurality of switching switches and the plurality of second switching circuits to keep bidirectionally disconnecting the path from the plurality of second conversion circuits to the at least another of the plurality of output terminals and to keep bidirectionally disconnecting the path from the plurality of second conversion circuits to the at least one of the plurality of output terminals.

14. The power supply as claimed in claim 9, wherein when the voltage requirement of the at least one of the plurality of output terminals is greater than the voltage requirement of the at least another of the plurality of output terminals, the control circuit is configured to control the first switching circuit to keep connecting the path from the first conversion circuit to the at least one of the plurality of output terminals and control the plurality of switching switches and the plurality of second switching circuits to keep disconnecting the path from the plurality of second conversion circuits to the at least one of the plurality of output terminals, and control the first switching circuit to keep disconnecting the path from the first conversion circuit to the at least another of the plurality of output terminals and control the plurality of switching switches and the plurality of second switching circuits to correspondingly connect the path from the plurality of second conversion circuits to the at least another of the plurality of output terminals.

15. The power supply as claimed in claim 9, wherein when the voltage requirement of the at least one of the plurality of output terminals is less than the voltage requirement of the at least another of the plurality of output terminals, the control circuit is configured to control the first switching circuit to disconnect the path from the first conversion circuit to the at least one of the plurality of output terminals and control the plurality of switching switches and the plurality of second switching circuits to connect the path from the plurality of second conversion circuits to the at least one of the plurality of output terminals, and control the first switching circuit to keep disconnecting the path from the first conversion circuit to the at least another of the plurality of output terminals and control the plurality of switching switches and the plurality of second switching circuits to keep disconnecting the path from the plurality of second conversion circuits to the at least another of the plurality of output terminals.

16. The power supply as claimed in claim 9, wherein the first switching circuit comprises:

a plurality of first switches coupled to the first conversion circuit and the control circuit, and respectively coupled to the plurality of output terminals, wherein junction diodes of the first switches are arranged in a reverse-biased direction from the first conversion circuit to the plurality of output terminals.

17. The power supply as claimed in claim 9, wherein each of the plurality of second switching circuits comprises:

a plurality of second switches coupled to the switching switch and the control circuit, and respectively coupled to the plurality of output terminals, wherein junction diodes of the second switches are arranged in a forward-biased direction from the switching switch to the plurality of output terminals, and a junction diode of the switching switch is arranged in a reverse-biased direction from the second conversion circuit to the plurality of second switches.

18. The power supply as claimed in claim 9, wherein each output terminal is coupled to less than two second switching circuits, and each second switching circuit comprises less than two second switches.

* * * * *